April 22, 1947. O. H. THOMAS ET AL 2,419,378
SUPPORT FOR FISHING POLES
Filed June 29, 1945
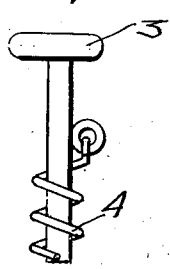
Fig. 1
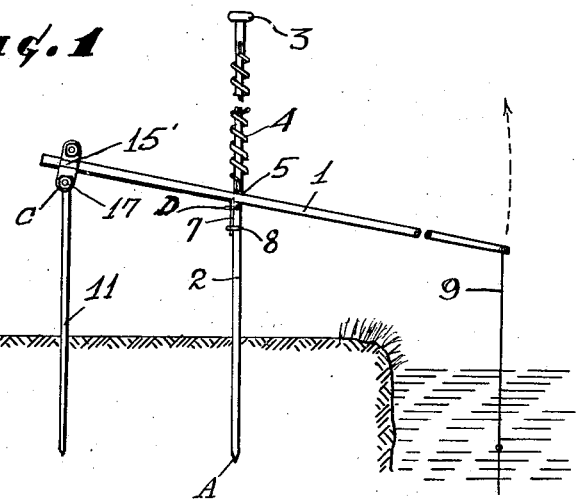
Fig. 3
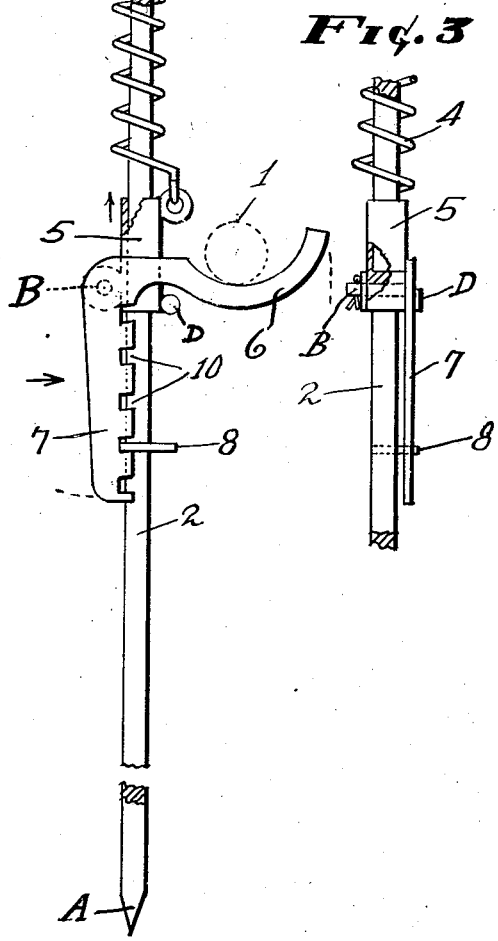
Fig. 4
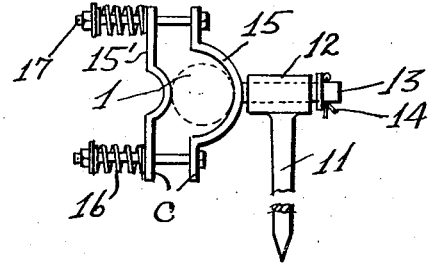
Fig. 5
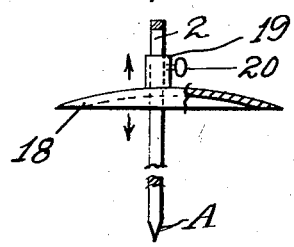
OSCAR H. THOMAS
WILLIE H. O'NEAL
FRANK P. SWORD
INVENTORS.
BY U. G. Charles
Atty.

Patented Apr. 22, 1947

2,419,378

UNITED STATES PATENT OFFICE 2,419,378

SUPPORT FOR FISHING POLES

Oscar H. Thomas, Willie H. O'Neal, and Frank P. Sword, Wichita, Kans.

Application June 29, 1945, Serial No. 602,320

3 Claims. (Cl. 43—15)

Our invention herein disclosed relates to a support for fishing poles, and has for its principal object, a means to automatically jerk the fishing line as a result of an energetic bite of a fish on a baited hook carried by the line of a fishing pole whereby the hook is secured to the fish prior to landing the same.

A further object of our invention is to anchor the fishing pole to avoid the possibility of a fish dragging the pole from its anchor, the pole being easily removed by a fisherman.

A still further object of our invention is to provide means to overcome obstacles such as muck, rock, stratum or the like along the bank of streams or other bodies of water, said means hereinafter being described.

A still further object of our invention is to construct a support for a fishing pole that may be set plurally by a single fisherman with an assurance that the poles thus set will function efficiently without immediate attention as the catch is assured.

These and other objects will hereinafter be more fully explained, reference being had to the accompanying drawing forming a part of this specification, and wherein like characters will apply to like parts in the different views.

Referring to the drawings:

Fig. 1 is a side view of the mechanism with pole attached.

Fig. 2 is an enlarged view of the fishing pole carrying means, showing the pole's saddle, and anchor or trigger for the spring that jerks the pole.

Fig. 3 is a fragmentary transverse view of Fig. 2, parts removed for convenience of illustration, said view looking in direction of the arrow in Fig. 2.

Fig. 4 is a view of the anchor clamp for the butt of the fishing pole looking in direction of said fishing pole longitudinally.

Fig. 5 is an elevation of the pole carrying rod showing an adjustable disc as a brace for the rod when the same is positioned on muck, or a non-penetrative condition.

As a more concise description of our invention, it will be seen that the carrying structure for a fishing pole 1 consists of a straight rod 2 rectangular in cross section to avoid easy turning when forced in the ground, said rod having one of its ends pointed as at A to freely penetrate when forced under pressure. Formed on the other end of the rod is a knob 3 as a convenience to force the rod into and from the ground. Wound on the rod along its upper portion is a coil spring 4, one end of which is secured to the rod adjacent the knob, the other end of said spring being secured to a sleeve 5 that slidably engages longitudinally on the rod. Rockably mounted as at B on the sleeve is a trigger consisting of legs 6 and 7 that extend substantially at a right angle from each other. It will be seen that leg 6 is arcuate in form, its concavity being on the upper side to function as a seat in which the fishing pole will engage to rock leg 7 outward from the sleeve to disengage the same for upward movement as tensioned by the spring. It will be understood that a detent 8 is secured to the rod well below the normal contracted point of the spring so that the fishing pole will be jerked upward upon release of the trigger from the detent, the action or jerk being actuated by an energetic bite of a fish on the bait of a hook carried by the pole's line 9, said hook and bait not shown in the drawings. It will be seen that a stop D is provided on the sleeve to check the downward movement of leg 6 to avoid dropping of the pole from its seat during action of the spring. Leg 7 has a plurality of notches 10 in a spaced relation therealong and in which the detent will engage selectively to vary the tension of the spring to assure carrying the weight of the pole and at the same time to assure the possibility of tripping the trigger by the fish bite to jerk the pole as tripping means for the spring action, the element D being the stop for arm 6.

It will be seen in Fig. 1 that an anchor for the pole at its rearward extremity is provided, said anchor consisting of a rod 11 to be insertible in the ground and having a rockable clamp on its upper extremity as shown in Fig. 4, said clamp comprising a cross head 12 secured to the upper end of said rod 11 and being axially bored to receive a spindle 13 trunnioned therein and being removably secured by a cotter pin 14 passing through its free end, said spindle having rigidly secured on its other end an arcuate jaw 15 in which the butt end of the fish pole will removably seat and be clamped by another jaw 15' formed in like manner to that of first said jaw each of which has ears C positioned in parallelism to move toward and from each other as tensioned by their respective springs 16 that are secured by pins 17 engaging through said ears that are apertured for the pins. Being so arranged, the said jaws will rock to suit the slant of the fishing pole in its operative position and said pole can be removed from the clamp readily to land a fish.

In Fig. 5 is shown a concavo-convex disc 18 that has a hub 19 axially bored to slidably engage on the rod of the pole carrying means and be secured by a set screw 20 whereby the rod is braced vertically in the event of muck or the like that is insecure for the rod. Furthermore should the rod encounter rock, the disc will function as seating means for the rod in or near a vertical position.

While we have shown a specific clamp for the butt of the pole, we do not wish to be restricted to such alone as the clamp may be varied and furthermore the pole may be eliminated and the line placed on the saddle in lieu thereof to function in like manner with respect to a jerk to trip the sleeve and such other modifications may be employed as lie within the scope of the appended claims.

Having fully described our invention, what we claim as new and desire to secure by Letters Patent is:

1. In a support for fishing poles, a rod having a knob on one end thereof, the other end being sharpened, a detent secured to the rod a spaced distance inward from the knob, a sleeve slidable on the rod between its knob and detent, a coil spring through which the rod extends, one end of the spring being secured to the rod adjacent the knob, the other end being secured to the sleeve, a notched trigger rockably mounted on the sleeve to engage the detent selectively with respect to the notches, said notched trigger having a seat to carry a fishing pole and to co-operate in disengaging the notched trigger from the detent when an increased weight is imposed on one end of the fishing pole, and means to retain the other end of the fishing pole stationarily with respect to vertical movement.

2. In a support for fishing poles, a rod vertically positioned and having a spring tensioned clamp on the upper end thereof to releasably secure one end of a fishing pole, another rod vertically positioned in working relation to said first rod, a sleeve to slidably engage the second-named rod, a trigger rockably carried by the sleeve, said trigger having a notched leg and an arcuate leg at right angles to each other, a detent secured to the rod to be engaged by the notched leg, the arcuate leg being adapted to function as a seat in which a fishing pole will rest inward from its said one end and cooperate in tripping the notched leg from the detent when the other end of the pole is jerked downward, and a coil spring having one end secured to said second-named rod adjacent its upper extremity, its other end being secured to the sleeve to jerk the free end of the fishing pole upwardly when the notched leg is released from the detent.

3. In a support for fishing poles of the class described comprising a rod, said rod being rectangular in cross section and having a knob on one end, the other end being sharpened to position the rod vertically in the ground, a spring wound on the rod, one end of said spring being secured to the rod adjacent the knob, a sleeve to slidably engage on the rod below the spring and to which the other end of said spring is secured, a detent secured to the rod a spaced distance below the sleeve, means rockably carried by the sleeve to carry a fishing pole intermediate of its ends and to engage the detent when the spring is tensioned toward the detent, said means being rocked from engagement with the said detent when one end of the pole is moved downwardly, another rod having a pointed end to secure the same vertically in working relation to the said first rod, and a clamp rockably mounted on the other end of the other rod to engage the other end of the fishing pole whereby the said first end of said fishing pole is moved upwardly by movement of the spring when the sleeve is released from the detent.

OSCAR H. THOMAS.
WILLIE H. O'NEAL.
FRANK P. SWORD.

REFERENCES CITED

The following references are of record in the file of this patent:

UNITED STATES PATENTS

| Number | Name | Date |
| --- | --- | --- |
| 371,777 | McCabe | Oct. 18, 1887 |
| 283,444 | Wentworth | Aug. 21, 1883 |
| 671,914 | Nesbit | Apr. 9, 1901 |